United States Patent [19]

Crouse et al.

[11] Patent Number: 4,510,214

[45] Date of Patent: Apr. 9, 1985

[54] ELECTRODE WITH ELECTRON TRANSFER CATALYST

[75] Inventors: Dennis N. Crouse, Melrose; James C. Reynolds, Waltham; Fraser M. Walsh, Arlington, all of Mass.

[73] Assignee: Tracer Technologies, Inc., Newton, Mass.

[21] Appl. No.: 523,419

[22] Filed: Aug. 16, 1983

Related U.S. Application Data

[63] Continuation-in-part of Ser. No. 193,818, Oct. 3, 1980, abandoned, which is a continuation of Ser. No. 060,929, Jul. 16, 1979, abandoned.

[51] Int. Cl.[3] .................. H01M 4/96; B01J 31/12; B01J 31/22; C25B 11/12
[52] U.S. Cl. .................... 429/43; 204/294; 427/113; 427/115; 427/419.8; 429/213; 502/101; 502/155; 502/159; 502/167
[58] Field of Search .............. 429/212, 213, 215, 27, 429/42, 43; 427/113, 115, 419.8; 204/294; 502/101, 155, 167, 5, 159

[56] References Cited

U.S. PATENT DOCUMENTS

| | | | |
|---|---|---|---|
| 3,410,727 | 11/1968 | Jasinski | 429/43 |
| 3,479,299 | 11/1969 | Rivin et al. | 252/426 |
| 3,821,028 | 6/1974 | Ziener et al. | 429/43 |
| 3,930,884 | 1/1976 | Zimmermann et al. | 429/27 |
| 4,029,854 | 6/1977 | Walsh et al. | 429/27 |
| 4,173,575 | 11/1979 | Carlock | 252/431 C |
| 4,174,428 | 11/1979 | Tabushi et al. | 521/32 |
| 4,230,828 | 10/1980 | Gaul, Jr. et al. | 521/32 |
| 4,251,607 | 2/1981 | Yamaki et al. | 429/194 |
| 4,255,498 | 3/1981 | Yoshida | 429/27 |
| 4,315,998 | 2/1982 | Neckers et al. | 204/159.14 |
| 4,328,125 | 5/1982 | Drago et al. | 252/428 |
| 4,361,497 | 11/1982 | Boldt et al. | 585/645 |
| 4,380,576 | 4/1983 | Yoshida et al. | 429/43 |
| 4,407,907 | 10/1983 | Takamura et al. | 429/42 |

FOREIGN PATENT DOCUMENTS

1213364 11/1970 United Kingdom .................. 429/43

OTHER PUBLICATIONS

Spiro, Michael, "Heterogeneous Catalysis in Solution", J. Chem. Soc., Faraday Trans. 75:1507-1512, (1979).
Saveant, Michael, "Catalysis of Chemical Reactions by Electrodes", Acc. Chem. Res. 13:323-329, (1980).
Chanon, Michel and Martin L. Tobe, "ETC: A Mechanistic Concept for Inorganic and Organic Chemistry", ANGEWANDTE CHEMIE, vol. 21, No. 1, Jan. 1982, pp. 1-23.

Primary Examiner—P. E. Konopka
Attorney, Agent, or Firm—Anthony M. Lorusso; George A. Loud

[57] ABSTRACT

The disclosed electrode includes an electroconductive substrate and an electron-transfer catalyst immobilized on the conductive support surface by being covalently bonded thereto via a linking ligand. The link (ligand) used to covalently bond the catalyst to the support surface can be either electrically conductive or nonconductive.

3 Claims, 2 Drawing Figures

ELECTRODE WITH ELECTRON TRANSFER CATALYST

CROSS-REFERENCE TO RELATED APPLICATION

The present application is a continuation-in-part of our copending application, U.S. Ser. No. 193,818 filed Oct. 3, 1980, now abandoned, and entitled "Electron Transfer Catalyst", which in turn, is a continuation application of U.S. Ser. No. 060,929 filed July 16, 1979, now abandoned.

BACKGROUND OF THE INVENTION

This invention relates generally to electrodes having surface bound electron-transfer catalysts.

The catalysts of the present invention are those which are used in mediating electron transfer processes. When attached to an electrode surface they act by altering the electromotive potential on the surface to which they are attached. When the molecule to be acted upon by the catalyst impinges upon the catalyzed surface, an electron transfer reaction occurs. The kinetics of this electron transfer process is affected by the positioning of the catalyst with respect to both the catalyzed surface and the reactive molecule.

An electron-transfer catalyst is generally a molecule which is capable of having overlapping electron spheres with both of the molecules to be acted upon. For example, in the case of electron-transfer from a molecule in solution to a conductive surface, the catalyst acts by having overlapping electron spheres with both the molecule in solution and the molecule making up the electronically conductive surface; by providing a continuous electron sphere overlap between the molecule in solution and the molecule making up the conductive surface, the electron-transfer catalyst increases the velocity of electron transfer between the molecule to be acted upon and the conductive surface.

Catalysts in general are usually employed in two forms. In one form the catalyst is immobilized on a support surface. Thus, the reactants to be catalyzed are caused to come in contact with the immobilized catalyst. For example, platinum can be absorbed on the surface of a carbon structure. Such a catalyst structure can be used for the production of hydrogen peroxide from hydrogen and oxygen by allowing the reactants, hydrogenn and oxygen, to flow past the platinum absorbed on the surface of the carbon.

A significant problem associated with utilizing an absorbed catalyst is that the catalyst can become deabsorbed. Such deabsorption, of course, presents many problems such as loss of the catalyst and/or contamination of the product.

Another approach to catalysis is to maintain the catalyst in a liquid carrier which includes the reactants. Such a procedure, of course, requires a separation step in order to prevent loss of the catalyst and also to remove the catalyst from the product. Obviously, such a procedure has disadvantages. Perhaps the most significant disadvantage, however, is associated with the requirement that the catalyst be separated from the reaction product. For example, the use of dichlorodicyanoquinone in the synthesis of ketones requires a laborsome separation of the catalyst from the ketone product.

As is well known in the art, electron-transfer catalysts are useful in a number of chemical and electrochemical processes. For example, in the generation of ketones from alcohols, discussed above, dichlorodicyanoquinone acts as an electron transfer catalyst.

Other examples of an electron transfer catalyst are the use of phthalocyanines, phenylporphyrins or dibenzotetraazaanulene organometallics in catalyzing the oxygen dissolution reaction in primary fuel cells.

Catalysts such as N,N'bisalkylated bipyridinium ions have been shown to catalyze the reduction of spinach ferrodoxin when adsorbed on gold while the gold electrode by itself will not catalyze this reaction. The adsorbed organic catalyst thus acts to reduce the overpotential of the electrode; but, the stability of this electrode is limited by the dissolution of the organic catalyst.

Electron-transfer catalysts suffer from a number of disadvantages, most of which are associated with the dissolution of the catalyst or separation of the catalyst from the reaction product.

An object of the invention is to immobilize an electron transfer catalysts on an electrode surface in a way that renders it resistant to loss or dispersion without significantly affecting its ability to function as a catalyst.

SUMMARY OF THE INVENTION

In its broadest aspect, the present invention is an electrode in the form of an electroconductive support having an electrontransfer catalyst covalently bonded thereto through an organic ligand. This bonding immobilizes the catalyst and renders it resistant to loss without affecting its ability to function as a catalyst.

DETAILED DESCRIPTION OF THE PREFERRED EMBODIMENT

Figure 1:
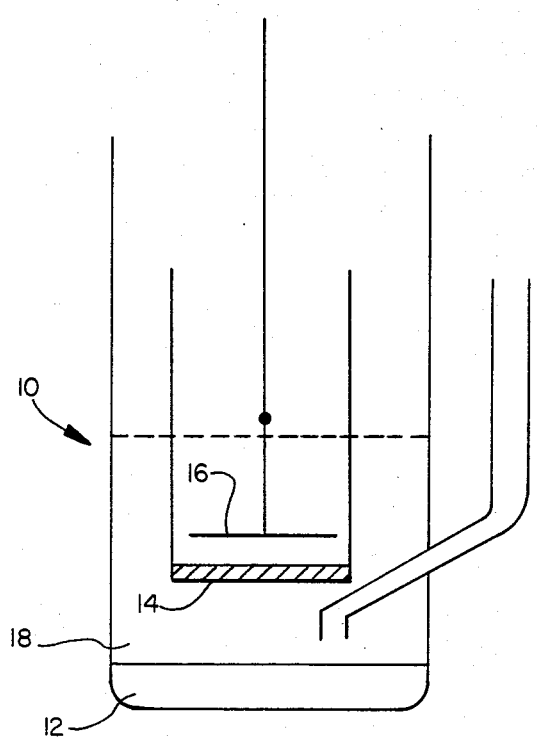
FIG. 1 is a schematic representation of a mercury cell including a mercury electrode in accordance with the present invention.

At the outset the invention is described in its broadest overall aspects with a more detailed description following. The catalytic structure of the present invention is comprised of three principal components: an electroconductive support, an electron transfer catalyst, and an organic member (ligand) linking the electron transfer catalyst to the support. Covalent bonds link the ligand to the electroconductive support and the catalyst to the ligand.

The support should be an electroconductive material, such as carbon, graphite, silicon or gold oxide, or a charge transfer polymer such as a sulfur nitride polymer or polyacetylene, which materials are capable of chemically reacting in a manner suitable for the covalent attachment of the linking ligand. The support is required to provide an anchor for the bonded electrontransfer catalyst and provides a matrix for electron transfer to or from the bonded electron-transfer catalyst.

The electron-transfer catalyst is a redox type catalyst and should be capable of reacting chemically in a manner suitable for covalent attachment to the linking ligand and should be capable of enhancing the rate of electron transfer from or to the molecule to be acted upon when so linked.

The organic linking ligand should be capable of being chemically reacted in a manner suitable for covalent attachment to both the support and the electron-transfer catalyst. The linking ligand need not itself be capable of transferring electrons but should, in the case of an electron-active conductive support, hold the electron-transfer catalyst in the near physical vicinity of the conductive support so as to permit overlapping of the electron spheres of molecules making up the support and the electron-transfer catalyst.

Preferably the ligand used to link the catalyst to the support surface has a structure and a chemical composition which renders it chemically inert to the reaction to be catalyzed and which also physically positions the catalyst in an optimal position to permit rapid electron transfer from either dissolved reactant or the conductive support surface.

The electrode may be of any conventional form, inclusive of monolithic graphite shapes, a mercury pool for a mercury cell and photoelectrodes for photovoltaic cells.

Generally the linking ligands will contain a number of atoms, such as carbon, hydrogen, oxygen and nitrogen, positioned to provide for desired chemical and electrochemical properties including inertness, facility of electron transfer and propensity to form a covalent bond with both the support surface and the electron-transfer catalyst. In regard to the latter, those skilled in the art will recognize that the chemical procedures required to covalently link a catalyst to a support surface may require chemical functionalization of the catalyst, the support, the linking ligand or any combination of the three.

The following examples further illustrate the invention:

EXAMPLE I

Samples of 4,4-biypridine were quaternized in methanol with both bromoacylated carbon (Vulcan XC-72, Cabot Corp.) or chloromethylated Biobeads (Biorad, Inc.). The bromoacylated carbon was prepared by reaction of six grams of Vulcan XC-72 under Friedel-Crafts alkylating conditions with six grams of 6-bromohexanoyl chloride in 120 ml of nitromethane with catalytic amounts of ferric chloride. Chemical mass analysis following exhaustive soxhlet extraction showed that a bonded catalyst loading of approximately 100M/g had been obtained for both the carbon and the organic polymer supports. Adsorbed controls were prepared by treating bromoacylated Vulcan XC-72 or chloromethylated Biobeads in methanol with N,N'dimethyl-4',4'-bipyridinium bromide to obtain an adsorbed catalyst loading by chemical analysis of 100M/g. When both the bonded and the adsorbed catalysts were put in a 5% ammonium acetate aqueous electrolyte, rapid dissolution of the adsorbed catalyst was observed while none was observed for the bonded catalyst independent of which support matrix was examined.

EXAMPLE II

This experiment utilized a mercury cell as depicted in FIG. 1. The mercury cell 10 contained a static mercury pool 12 4.5 cm in diameter, a fritted glass diaphragm 14, an anode 16 and a 5% aqueous ammonium acetate electrolyte 18.

100 mg each samples of bonded-catalyst and of adsorbed catalyst described in Example I were sequentially added to the cell 10. The added catalyst formed a deposit on the surface of the mercury pool 12. The catalyst coated mercury pool cathode constituted an electrode in accordance with the present invention. After the samples had settled in approximately equal depth layers, the steady state current was measured as a function of voltage applied to the mercury pool with the solution kept deoxygenated with a nitrogen atmosphere. The results obtained are shown in Table I.

TABLE I

| Catalyst Activity Under Nitrogen in Amps After Exhaustive Extraction | | | | |
|---|---|---|---|---|
| | | Voltage Applied (vs. SCE) | | |
| Support Matrix | Catalyst | −0.75 | −0.85 | −0.95 |
| | | Current Measured, Amps. | | |
| Biobeads | Bonded (0.093 mM/g) | 10 | 30 | 50 |
| | Adsorbed | 0 | 0 | 0 |
| Vulcan XC-72 | Bonded (0.096 mM/g) | 60 | 220 | 340 |
| | Adsorbed | 10 | 10 | 20 |

The current measured shows the level of faradic processes occurring in the catalyzed matrix or on the surface of the mercury pool. The bonded-catalyst is shown to have significantly greater electron transfer activity (current measured) than an adsorbed catalyst on the same support surface (Vulcan XC-72) or a catalyst desorbed from a non-adsorptive organic polymer support (Biobeads).

EXAMPLE III

A comparison was made of the electron transfer activity (current measured) for bonded-catalysts prepared as described in Examples I and II. The six-fold increases in current measured between the conductive support (Vulcan XC-72) and the nonconductive support (Biobeads) as shown in Table I is the result of stepwise electron transfer from mercury to the conductive carbon support to the bonded catalyst. The polymer's lack of conductivity precludes this type of electron transfer. When no further voltage was applied, the carbon with the bonded-catalyst had an open-circuit potential of −0.70 V vs. SCE and was capable of being discharged under load. The polymer with the bonded-catalyst did not display this behavior under load. This difference in behavior shows that electrons can be transferred reversibly between a conductive support and a bonded-catalyst.

EXAMPLE IV 100 mg. each samples of the bonded-catalyst on either carbon (Vulcan XC-72) or an organic polymer (Biobeads) or of the supports without catalyst were placed sequentially in a mercury cell as depicted in FIG. 1 and containing 20 ml of oxygenated 5% aqueous ammonium acetate and a 4.5 cm diameter static mercury pool. After the samples had settled to approximately equal depth on the mercury pool, the diffusion limited current was measured as shown in Table 2.

TABLE 2

| Oxygen Reduction on Solid Supports with and Without Bonded Catalyst | | |
|---|---|---|
| Support Matrix | Catalyst | Diffusion Limited Current in Amps. @ −0.75 V vs. SCE[1] |
| Bromoacylated Vulcan XC-72 | None | 13 |

TABLE 2-continued
Oxygen Reduction on Solid Supports with and Without Bonded Catalyst

| Support Matrix | Catalyst | Diffusion Limited Current in Amps. @ −0.75 V vs. SCE[1] |
|---|---|---|
| Bromoacylated Vulcan XC-72 | 4,4'-bipyridine | 400 |
| Chloromethylated Biobeads | None | 0 |
| Chloromethylated Biobeads | 4,4'-bipyridine | 66 |

[1]Static solution equilibraded with air.

From these data it can be concluded that the bonded catalyst acts to catalyze the reduction of dissolved oxygen by passing electrons from the mercury pool via the catalyst to the oxygen molecules: use of a conductive support provides for increased surface area capable of electron transfer and therefore increased current was observed for the conductive (carbon) versus nonconductive (organic polymer) support.

Cobalt dibenzotetraazaannulene was covalently linked to carbon (Vulcan XC-72, Cabot Corp.) by the following procedure: 250 mg of bis-N,N-dimethyl-aminomethyl dibenzotetraazaannulene were reacted with 2 g of bromoacylated carbon (ECO, Inc.) in 400 ml of methanol. Two ml of methyl bromide were then added to quaternize unreacted sites on the bis-aminated dibenzotetraazaannulene. The bonded-carbon was harvested by centrifugation, washed with fresh methanol and resuspended in 20 ml of hot sulfolane containing 250 mg of cobalt acetate and a catalytic amount of capric acid. This mixture was stirred overnight at 100° C. under argon; the metallated bonded-carbon was washed by centrifugation with sulfolane, methanol, water 85% phosphoric acid and finally water until a neutral effluent was obtained. After drying the resultant product under vacuum, a 41% mass yield was obtained. Analysis of the product by atomic absorption spectrometry for cobalt showed a bonded loading level of cobalt dibenzotetraazaannulene of approximately 3% by weight.

An adsorbed control was prepared by mixing 250 mg of bis-N,N,N-trimethyl aminomethyl dibenzo-tetraazzaannulene bromide with 2 g of bromoacylated carbon and then following the same metallation and harvesting procedure as described above. Analysis of the product obtained, based on cobalt determination, showed on adsorbed loading level of catalyst of approximately 1.3% by weight.

The adsorbed control and the bonded-carbon were held in 150° C. 85% phosphoric acid for 10 days. Analysis of the two materials after the ten day treatment period showed that the bonded-carbon retained 1.4% by weight metallated catalyst while the adsorbed control contained only 0.6%.

Figure 2:
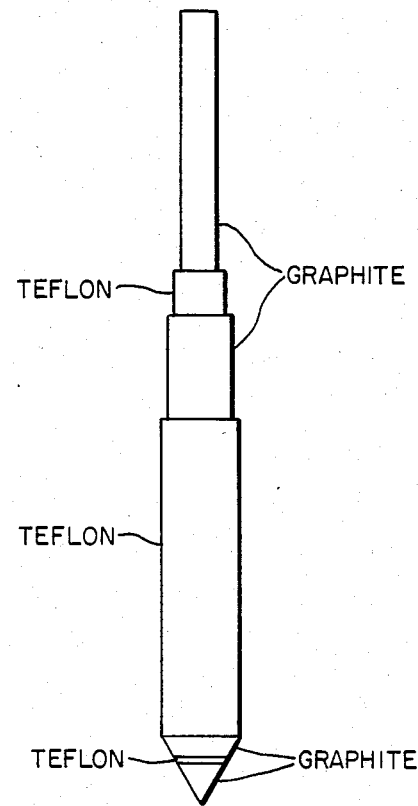
FIG. 2 is a schematic representation of a rotating ring-disk electrode in accordance with the present invention.

The bonded-carbon which had been acid treated was formed into a 50% by weight pellet with paraffin and the pellet was inserted into the hollow tip (A') of a rotating electrode assembly (Pine Instrument Co.) as shown in FIG. 2. The catalytic activity of the bonded-carbon was measured at +0.1 V vs hydrogen at RPM of 6400 to be 0.41 mA/in in oxygen 85% phosphoric acid at room temperature and to be linearly related to RPM. When the phosphoric acid was maintained under a saturated nitrogen atmosphere, no significant current passage was observed; a control of uncatalyzed carbon also showed no significant current passage.

These results show that cobalt dibenzotetraazaannulene, when covalently linked to the surface of a conductive support, remains stable and active as an oxygen dissolution reaction catalyst even when treated with 150° C. 85% phosphoric acid and is thus a useful catalyst in primary fuel cells.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In an electrochemical cell, the improvement comprising an electrode comprising an electroconductive carbon substrate, a ligand covalently bonded to said substrate, said ligand being selected from the group consisting of haloacyl and halomethyl, and an electron-transfer catalyst linked to said substrate by covalent bonding to said ligand, said electron-transfer catalyst serving to enhance electron transfer between said substrate and a molecule to be acted upon.

2. The electrode of claim 1 wherein said electron-transfer catalyst is a redox catalyst.

3. The electrode of claim 1 wherein said ligand is a bromoacyl group or a chloromethyl group.

* * * * *